Figure 1:
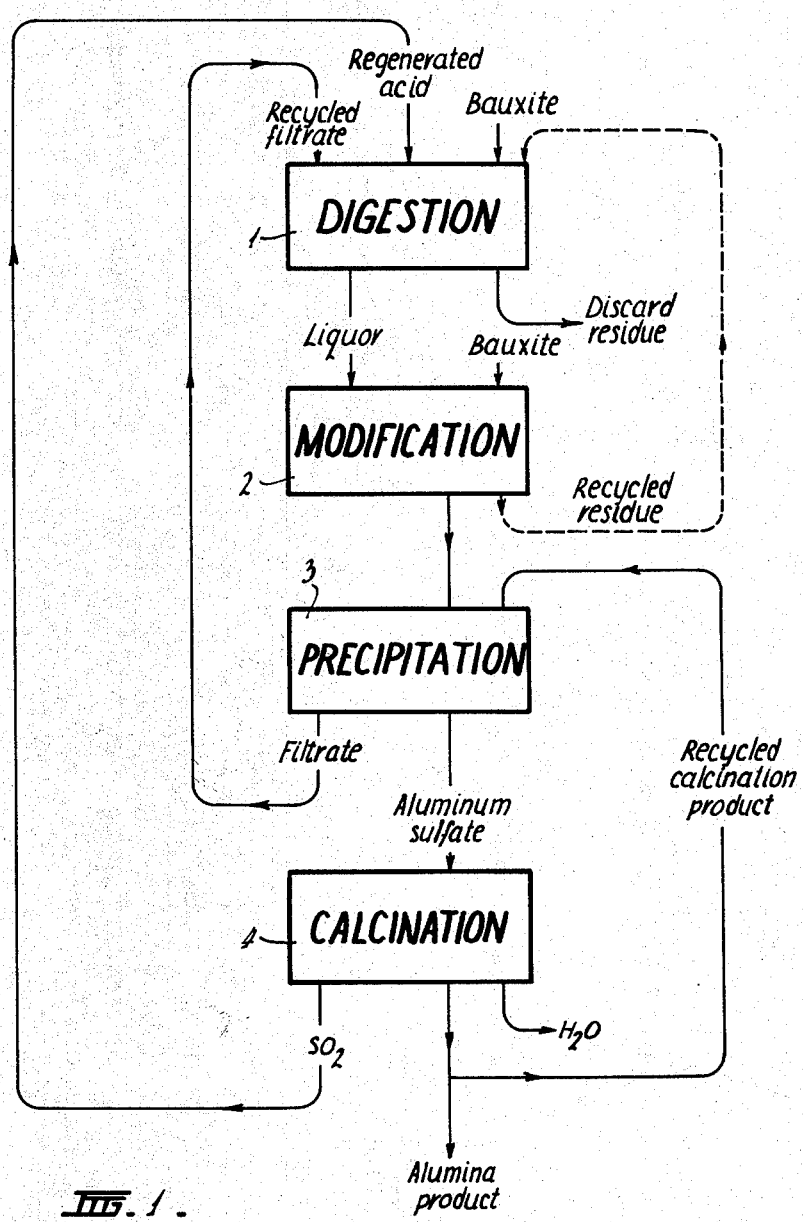

United States Patent Office 3,185,545
Patented May 25, 1965

3,185,545
PRODUCTION OF ALUMINA
Thomas Robert Scott, Blackburn, Victoria, Australia, assignor to Commonwealth Scientific and Industrial Research Organization, Victoria, Australia, a body corporate
Filed Nov. 8, 1962, Ser. No. 236,359
Claims priority, application Australia, Aug. 21, 1958, 40,706/58, Patent 237,278; July 5, 1961, 6,642/61
6 Claims. (Cl. 23—141)

This application is a continuation-in-part of application Serial No. 834,521, filed August 18, 1959, and now abandoned.

This invention relates to an improved process for the production of alumina from sources of aluminum, for example bauxite, certain types of clay, or other aluminum-bearing ores.

The usual process for obtaining purified alumina from ores such as bauxite consists broadly in dissolving the ore in caustic soda to eliminate iron and then precipitating alumina hydrate from the alkaline solution. The precipitate is finally calcined to produce alumina. This procedure will be hereinafter referred to as the "alkaline process."

In some circumstances, acid processes could be economically advantageous compared with the alkaline process for one or more of the following reasons:
(i) Greater accessibility or lower cost of acid process reagents.
(ii) Lower capital and/or operating costs of the acid process.
(iii) Applicability of the acid process to ores such as clays and high-silica bauxites which cannot be economically treated by the alkaline process.

Acid processes based on the principle of recovering aluminum in the form of aluminum sulfate crystals from acid digestion liquors have met with little success in the past, however, either because of excessive operating or capital costs or because of the difficulty of producing alumina of suitable purity for the subsequent reduction to aluminum metal. The difficulties have, inter alia, arisen partly from the slow and expensive methods required for the crystallization of aluminum sulfate from the digestion liquors and partly from the undesirable contamination of the product, with respect to iron, which often occurs.

The objects of the present invention are accordingly to overcome the problems previously encountered in acid processes and to provide a process for the production of alumina from either high- or low-grade ores, which can be operated economically and at the same time produce alumina of such purity as to be acceptable for reduction to aluminum metal by conventional procedures.

According to the invention, an acid process for the production of alumina from an acid digestion liquor produced by dissolving an aluminum-bearing ore in sulphuric acid comprises the steps of digesting basic aluminum sulfate, an aluminum-bearing ore (such as bauxite) or alumina with the digestion liquor at a temperature between substantially 100° C. to 140° C. to reduce the ratio by weight of $SO_3:Al_2O_3$ in the digestion liquor to a value within the range of 1.3 to 2.35, hydrolyzing the modified digestion liquor at a temperature between 180° C. and 300° C. to precipitate basic aluminum sulfate, and calcining the precipitated basic aluminum sulfate to produce alumina. Normally the precipitated compound consists essentially of basic aluminum sulfate having a formula close to $3Al_2O_3.4SO_3.9H_2O$. Preferably the hydrolysis is carried out in a pressure vessel within the temperature range of 200° C. to 250° C. More specifically, it is preferred to carry out the hydrolysis step at temperatures within the range 200° C. to 230° C. at a $SO_3:Al_2O_3$ ratio within the range 1.6–2.0.

It would be possible to reduce the effective ratio of $SO_3:Al_2O_3$ in the digestion liquor by adding an alkali metal hydroxide (e.g. sodium hydroxide) to the digestion liquor prior to the hydrolysis stage, but such a procedure would yield a hydrolysis product contaminated to an undesirable extent with alkali metal. For example, when using sodium hydroxide, the alumina end product may contain several percent $Na_2O$. It would also be possible to reduce the ratio of $SO_3:Al_2O_3$ in the digestion liquor by the addition of lime. This would lower the said ratio by removing $SO_3$ from the solution as calcium sulfate, but the loss of sulfate in the calcium sulfate residue would represent a serious economic disadvantage in the overall process.

On the other hand, the present invention envisages several methods of modifying the digestion liquor without introducing contaminants the presence of which in the final product above certain limits renders the product unsuitable for reduction to metal. Three such methods are set out hereunder, such methods being capable of being used either singly or in combination to produce the desired degree of modification, i.e., the desired $SO_3:Al_2O_3$ ratio in solution. The methods may comprise:

(i) Treatment of the acid digestion liquor for a suitable period (e.g. 30 minutes) at a temperature in the range 100°–140° C. with a suitable source of alumina (e.g. bauxite). Under the appropriate conditions, additional alumina is dissolved and frequently some sulfate combines with the solid ore, thus achieving in either or both ways an overall decrease in the $SO_3:Al_2O_3$ ratio in the liquor and causing the solution to become more basic. This form of modification can be applied at temperatures above 140° C., but at the expense of removing excessive amounts of sulfate from solution together with some of the previously-dissolved alumina. At temperatures below 100° C., the reaction proceeds relatively slowly.

(ii) Addition of basic aluminum sulfate to digestion liquor, whether the liquor has already been modified in some other way or not. Any basic sulfate of aluminum will serve for this purpose, since all such compounds have a ratio of $SO_3:Al_2O_3$ less than 2.35. Use may be made for this purpose of the basic sulfate produced by the hydrolysis stage, and which has a ratio of $SO_3:Al_2O_3$ approximately equal to 1. Under these circumstances, it is obviously necessary to produce a high yield of basic sulfate in the hydrolysis stage, so that sufficient material is available both for the modification stage and for sending to the calcination stage, to yield the required alumina product.

(iii) Addition of reactive alumina to the digestion liquor whether the liquor has already been modified in some other way or not. Preferably, reactive alumina produced in the course of the calcination stage is used.

For low cost and high efficiency combined, methods (i) and (iii) are preferred as a means of reducing the $SO_3:Al_2O_3$ ratio.

As referred to above, a disadvantage of previously used acid processes was the contamination of the alumina product with respect to iron. The present invention overcomes this problem by enabling most of the iron to be removed from solution prior to the hydrolysis stage and by insuring that residual iron in the digestion liquor is reduced to the ferrous state prior to the hydrolysis stage, thereby preventing the contamination of the hydrolysis product with a significant amount of iron compounds.

If method (i) is used for reducing the $SO_3:Al_2O_3$ ratio in the digestion liquor, the iron content of the liquor is considerably decreased by the hydrolysis of ferric sulfate to produce insoluble iron oxides which can be filtered off prior to hydrolysis.

It will be appreciated that all three of the above-mentioned methods bring about modification of the digestion liquor without introducing deleterious impurities. While the bauxite used in method (i) may introduce iron, the amount of such impurity is not significant because, as explained above, the process of the invention provides methods for ensuring that the alumina product is not contaminated with iron to an undesirable extent.

Having set forth the broader aspects of the invention, a typical procedure for preparing high-purity alumina from bauxite will now be described in more detail, merely by way of example and without limiting the scope of the invention to the positive terms thereof. To simplify the description, reference will be had to FIGURE 1 of the accompanying drawings, which comprises a flow sheet indicating the various stages of the process.

Crushed bauxite is digested at stage 1 with sulfuric acid, under pressure and with agitation and aeration, at temperatures in excess of 100° C. The time of digestion decreases with the temperature used (e.g. at 180° C., 30 minutes at temperature is sufficient). Under suitable conditions, pyrite can be substituted in whole or in part for sulfuric acid, provided that adequate air or oxygen is supplied for oxidation. Recycled acid liquors from subsequent stages can also be used in the digestion stage.

After filtering the pulp and discarding the solid residue, the liquor is modified at stage 2 by heating an excess of finely-crushed bauxite with the digestion liquor as in stage 1, but maintaining the temperature below 140° C., but not below 100° C. After a further filtration, the resultant liquor is treated with a suitable small quantity of a suitable reducing agent (e.g. sulphur dioxide) to bring all dissolved iron to the ferrous state.

The modified liquor, having an $SO_3:Al_2O_3$ ratio of approximately 1.9, is placed at stage 3 in a pressure vessel together with reactive alumina recycled from subsequent stage 4 to reduce the $SO_3:Al_2O_3$ ratio still further. The contents of the vessel are then heated under pressure in a non-oxidizing atmosphere at a temperature preferably in excess of 190° C. (but below 300° C.) for a period of approximately 30 minutes. This causes basic aluminum sulfate to precipitate out, and after cooling and filtration, the filtrate is returned to stage 1 of the process. The basic aluminum sulfate is then calcined at stage 4 at temperatures in the range of 1000° C.–1200° C. for a suitable period to form alumina which is the desired product. Part of this product is recycled to stage 3, while the sulphurous gases evolved in the course of calcination are recycled either directly or indirectly to the digestion stage 1.

For economic operation, a hydrolysis yield at stage 3 of the order of at least 50 percent is desired. This may be achieved by using high temperatures at the hydrolysis stage, and/or by using low $SO_3:Al_2O_3$ ratios at the hydrolysis stage. It is thus possible to distinguish three broad groups of operating conditions, viz:

(a) At temperatures in the region of 300° C. with little modification (e.g. using $SO_3:Al_2O_3$ ratios of 2.20 or or more).

(b) At temperatures in the region of 180° C. with considerable modification (i.e. using $SO_3:Al_2O_3$ ratios approximately in the range 1.4–1.6).

(c) At temperatures in the range 200° C. to 250° C. with an intermediate degree of modification (i.e. using an $SO_3:Al_2O_3$ ratio within the range of 1.6 to 2.0).

The use of extreme temperatures as in (a) would be uneconomic because of excessive equipment and operational costs. The use of temperatures in the region of 180° C. as in (b) would also be uneconomic because of the cost of modifying solutions to a low $SO_3:Al_2O_3$ ratio. Procedures in accordance with (c) above, would, by way of contrast, enable a suitable hydrolysis yield to be obtained at economic cost.

The following table shows the hydrolysis yields to be expected under a typical set of process conditions, viz. 30 minutes heating at 220° C. with 100 gm./litre $Al_2O_3$ in solution:

HYDROLYSIS OF ALUMINUM SULFATE

| Ratio by weight $SO_3:Al_2O_3$ | Hydrolysis yield, percent |
|---|---|
| 2.3 | 10 |
| 2.1 | 28 |
| 1.9 | 46 |
| 1.7 | 60 |
| 1.5 | 74 |

By reference to the table, it is obviously advantageous to conduct the hydrolysis stage under conditions where the $SO_3:Al_2O_3$ ratio is low. Generally the ratio can be brought to approximately 1.9 by treating acid digestion liquor with an excess of bauxite in the temperature range 100°–140° C. but it is uneconomic to attempt to reduce the ratio to a much lower figure by this method. Accordingly it is preferred to reduce the ratio to a figure below 1.9 adding instead reactive alumina at the hydrolysis stage.

Suitably reactive alumina may be conveniently produced in the following manner. During the calcination stage of the process, the basic aluminum sulfate produced in the hydrolysis stage gradually loses sulphur trioxide, forming materials which have a lower $SO_3:Al_2O_3$ ratio than the normal hydrolysis product and eventually forming alumina having a negligible content of sulphur trioxide. The present inventor has also found that the material introduced into the digestion liquor to reduce the ratio by weight of $SO_3:Al_2O_3$ can with advantage be material produced in the calcination stage of the process, since a given amount of calcined material is more basic— and can therefore produce a greater decrease in the $SO_3:Al_2O_3$ ratio—than a corresponding amount of basic aluminum sulfate prior to calcination. Thus according to this feature of the invention, decrease in the ratio by weight of $SO_3:Al_2O_3$ is preferably achieved by adding to reduced digestion liquor a product obtained by calcination of the basic aluminum sulfate precipitated in the hydrolysis stage of the process.

The calcination product which is used to reduce the ratio by weight of $SO_3:Al_2O_3$ is preferably a reactive form of alumina produced by calcination in the temperature range 700 to 1000° C., for example eta- or gamma-alumina. Some useful effect has been detected, however, with the alpha-alumina which is obtained as the end-product of the calcination stage in the range of 1100 to 1300° C., and even partly-decomposed basic aluminum sulfate, produced at temperatures in the range 600 to 800° C. and containing less sulphur trioxide than the hydrolysis product, would have a useful effect.

The preferred procedure is for the calcination product to be added to digestion liquor which has already been modified to some extent in some other manner, for example by the addition of bauxite or a low-grade aluminum-bearing ore, since a particularly high yield is obtained by means of this preferred procedure.

An improvement in the yield may also be obtained by adding the calcination product to the digestion liquor during the hydrolysis stage, after hydrolysis has proceeded for some time.

FIGURE 1 of the accompanying drawings shows a flow sheet illustrating by way of example the preferred feature of the present invention according to which some of the calcination product is recycled to reduce the ratio by weight of $SO_3:Al_2O_3$.

Figure 2:
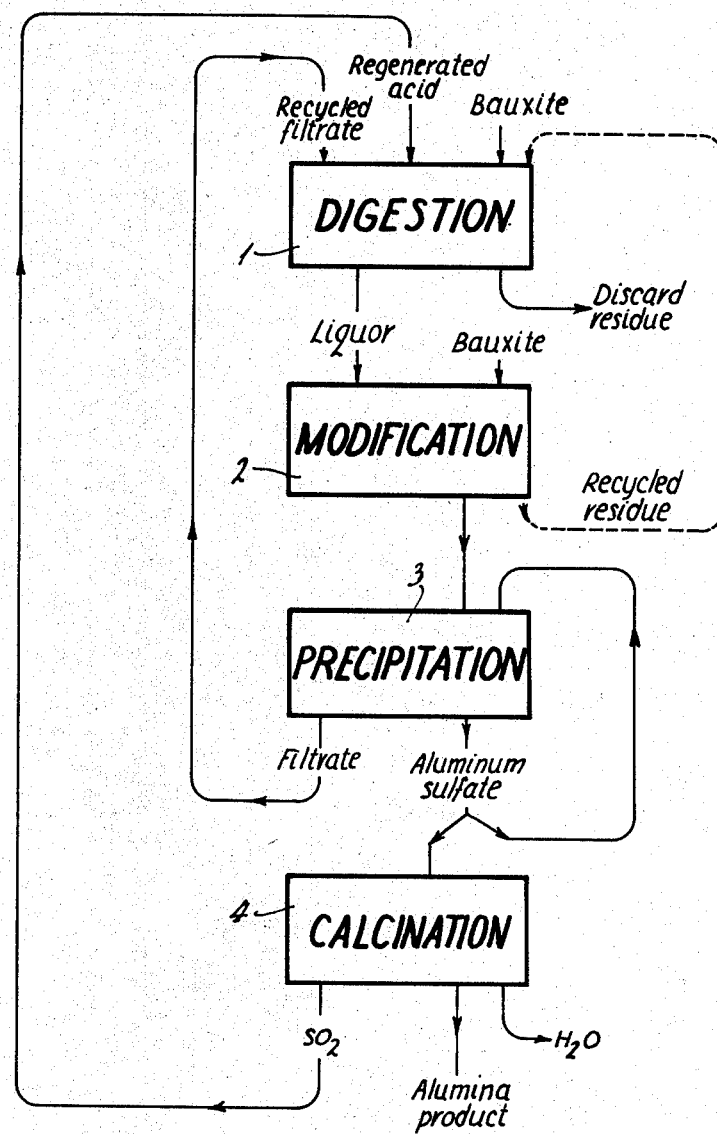

An alternative procedure for increasing the hydrolysis yield is illustrated in FIGURE 2, which illustrates a process which is similar to that shown in FIGURE 1 in stages 1 and 2, but wherein part of the basic aluminum sulfate produced in hydrolysis stage 3 is recycled to that stage instead of the calcination product produced in stage 4.

A number of specific examples of processes according to the invention will now be given by way of illustration. Other examples are included for the purpose of comparison.

Example 1

An acid digestion liquor containing 75 gm. $Al_2O_3$ per litre ($SO_3:Al_2O_3$ ratio 2.5 by weight) was heated for 30 minutes at 130° C. with bauxite to produce modified digestion liquor ($SO_3:Al_2O_3$ ratio 1.88 by weight) containing 102 gm. $Al_2O_3$ per litre. The modified liquor was treated at 100° C. with sulfur dioxide to reduce iron to the ferrous state. 200 ml. of the modified and reduced liquor were then heated in an autoclave with 7.5 gm. of reactive alumina (produced by calcination at 900° C. of a basic aluminum sulfate obtained as hydrolysis product in a previous run) for 30 minutes at 220° C. A solid hydrolysis product, weighting 35.2 grams and containing 41.2% alumina, was recovered. The overall yield based on the autoclave contents was 70 percent. The net yield from liquor alone (excluding the weight of added alumina) was 59.6 percent. The solid product recovered from the autoclave was then calcined at 1100° C. to produce 14.5 grams of alumina of such purity as to be acceptable for reduction to aluminum metal by conventional procedures.

For the purpose of comparison, the operation described was repeated without the addition of active alumina to the modified and reduced digestion liquor. A solid hydrolysis product weighing 24.3 grams and containing 39.5 percent alumina was recovered after cooling. The overall yield based on the autoclave contents (which with this procedure is the same as the net yield from liquor alone) was 47 percent.

Example 2

The operation described in the first paragraph of Example 1 was repeated except that the reactive alumina was not added to the solution until the solution had been at temperature in the autoclave for 10 minutes. A solid hydrolysis product weighing 40.8 grams and containing 39.6 percent alumina was recovered after cooling. The overall yield based on the autoclave contents was 77.8 percent. The net yield from liquor alone (excluding the weight of added alumina) was 69.6 percent.

Example 3 (not within invention)

An acid digestion liquor ($SO_3:Al_2O_3$ ratio 2.5 by weight) containing 102 gm. $Al_2O_3$ per litre was, without any modification with bauxite, treated at 100° C. with sulfur dioxide to reduce iron to the ferrous state. 200 ml. of the reduced liquor were then heated in an autoclave with 10.6 gm. of reactive alumina (produced by calcination at 900° C. of a basic aluminum sulfate obtained as hydrolysis product in a previous run) for 30 minutes at 220° C. A solid hydrolysis product, weighing 34.2 grams and containing 41.9% alumina, was recovered after cooling. The overall yield based on the autoclave contents was 49.3 percent. The net yield from liquor alone (excluding the weight of added alumina) was 21.0 percent. This result indicates that high net yields of product are not obtained at the hydrolysis stage unless the liquor has had prior modification as exemplified in Example I.

For the purpose of further comparison, the operation described was repeated without the addition of reactive alumina to the reduced (but unmodified) digestion liquor. The yield of hydrolysis product was less than one percent.

Example 4

200 ml. of aluminum sulfate solution after heating with bauxite at 130° and filtering, contained 34 gm. $Al_2O_3$ per litre and had an $SO_3:Al_2O_3$ ratio of 2.22. This filtered solution was treated at 100° C. with sulfur dioxide to reduce iron to the ferrous state. The reduced liquor was then placed in an autoclave and further modified by the addition of 13 gm. of basic aluminum sulfate, so that the $SO_3:Al_2O_3$ ratio of the autoclave contents was decreased to a value of 1.70. The autoclave and contents were heated to a temperature of approximately 230° C. and maintained at temperature for 30 minutes under an atmosphere of nitrogen. The total solid product weighed 21 gm. and contained 70 percent of the alumina originally placed in the autoclave.

Example 5

400 ml. of a solution of aluminum sulfate containing 51 gm. per litre of $Al_2O_3$ was digested with 18 gm. bauxite in an autoclave for 30 minutes at 130° C. The resultant liquor after filtration had an $SO_3:Al_2O_3$ ratio of 1.90. This degree of modification was achieved mainly by solution of additional alumina from the added bauxite and to a lesser extent by the removal of 1.66 gm. $SO_3$ from the starting liquor into the final solid residue. The modified liquor was then treated at 100° C. with sulfur dioxide to reduce iron to the ferrous state. To a portion of the modified and reduced liquor was added 27.8 gm. of basic aluminum sulfate, so that the mixture had an overall ratio of $SO_3:Al_2O_3$ of 1.58. The mixture was then heated in an autoclave for 30 minutes at a temperature of 220° C. and the resultant hydrolysis product, which was a basic sulfate of aluminum, had a weight of 45.9 gm. representing a net gain of 18.1 gm. basic aluminum sulfate. The solid product contained 60 percent of the total alumina added to the autoclave.

Example 6

An experiment similar to Example 5 was performed, with the difference that a larger amount of basic aluminum sulfate was added prior to hydrolysis, to give a mixture having an $SO_3:Al_2O_3$ ratio of 1.525. The solid product in this instance contained 65 percent of the total alumina added to the autoclave.

I claim:

1. In an acid process for the production of alumina from an acid digestion liquor produced by dissolving an aluminum-bearing ore in sulfuric acid, the steps of digesting an aluminum-bearing ore in the acid digestion liquor at a temperature between about 100° C. and about 140° C. to reduce the ratio by weight of $SO_3:Al_2O_3$ in the digestion liquor to a value within the range of 1.3 to 2.35, filtering the liquor to remove solid residue, treating the thusly modified digestion liquor with a reducing agent to reduce any ferric iron present in solution to the ferrous state, adding reactive alumina to the thusly modified digestion liquor, hydrolyzing the modified digestion liquor at a temperature between 180° C. and 300° C. in a non-oxidizing atmosphere to precipitate basic aluminum sulfate, and calcining the precipitated basic aluminum sulfate to produce alumina.

2. A process as claimed in claim 1 wherein the said ratio of $SO_3:Al_2O_3$ in the acid digestion liquor is reduced to about 1.9 during the said digestion with aluminum-bearing ore.

3. A process as claimed in claim 1 wherein the reactive alumina is obtained from the calcining step.

4. A process as claimed in claim 3 wherein the temperature in the calcining step is brought to a temperature exceeding 1100° C. and wherein the reactive alumina is obtained by heating said precipitated basic sulfate to within the temperature range of from 700–1000° C.

5. A process as claimed in claim 1 wherein the liquor is hydrolized between 200 and 230° C.

6. A process as claimed in claim 1 wherein the reactive alumina is added after the initiating of the hydrolyzing step.

References Cited by the Examiner

UNITED STATES PATENTS

| | | | |
|---|---|---|---|
| 1,256,605 | 2/18 | Spence et al. | 23—124 |
| 1,663,435 | 3/28 | Bradner | 23—123 X |
| 1,752,599 | 4/30 | Kjellgren | 23—141 X |
| 2,323,499 | 7/43 | Wilson | 23—123 |
| 2,332,285 | 10/43 | Wilson | 23—123 |

FOREIGN PATENTS 123,720    1920    Great Britain.

MAURICE A. BRINDISI, *Primary Examiner.*